United States Patent [19]
Pritchard

[11] Patent Number: 4,787,879
[45] Date of Patent: Nov. 29, 1988

[54] FIFTEEN SPEED VARIABLE RADIUS BICYCLE TRANSMISSION

[75] Inventor: James F. Pritchard, Leominster, Mass.

[73] Assignee: Exeter Granddiorite Trust, Leominster, Mass.

[21] Appl. No.: 115,112

[22] Filed: Nov. 2, 1987

[51] Int. Cl.$^4$ ............................................. F16H 55/52
[52] U.S. Cl. .................................. 474/49; 474/56
[58] Field of Search ............... 474/47, 49, 50, 69, 474/70, 56

[56] References Cited

U.S. PATENT DOCUMENTS 3,661,024  5/1972  Cooke ............................. 474/56
3,956,944  5/1976  Tompkins ......................... 474/50

Primary Examiner—Thuy M. Bui
Attorney, Agent, or Firm—Charles R. Fay

[57] ABSTRACT

A fifteen speed bicycle transmissiion wholly located on the rear driving wheel except for a manual control mounted elsewhere, e.g. on the handle bar, and including two closely arranged circular co-axial plates on the hub, one plate being a drive plate with radial slots and the other plate being a cam plate with curved slots, and sprocket elements each located in a combined curved and straight slot for radial adjustment upon rotary motion between plates, and locking member including notches and pawls on the plates at the peripheries thereof and actuated to unlock the plates by the control.

15 Claims, 2 Drawing Sheets

FIFTEEN SPEED VARIABLE RADIUS BICYCLE TRANSMISSION

BACKGROUND OF THE INVENTION

This invention presents an improvement in bicycle speed transmissions by being simplified in construction and operation over prior art and comprises a mechanism that is mounted wholly on the rear wheel driving hub or axle. It is also very narrow in axial dimension as compared to the prior art and is inexpensive.

SUMMARY OF THE DISCLOSURE

A drive plate with six radial slots accommodating sliders is fixed to the hub of the rear wheel of a bicycle. Two only diametrically opposed sliders have sprocket segments for the drive chain. A cam plate in side by side axially aligned relation to the drive plate is free of the hub but elastomerically connected to the drive plate to rotate therewith. The cam plate has fifteen ratchet notches on its periphery and there are two shift pawls 180 degrees apart cooperating with the ratchet notches providing correct cam plate-drive plate relationship for the fifteen specific gear ratios. The two pawls have a relation with the notches so that but one acts at a time.

The pawl at operation position is manually temporarily withdrawn from its notch by a device on the handle bar or other convenient location to allow relative rotation of cam plate and drive plate to force the sliders radially or the drive plate, and thereby change the diameter of the portion of the drive chain that is driving the drive plate and the wheel. High gear with a fifty-two tooth pedal sprocket and a twenty-seven inch wheel equals $52/14 \times 27 = 100.3$. Low gear equals $52/42 \times 27 = 33.4$.

PREFERRED EMBODIMENT OF THE INVENTION

Figure 1:
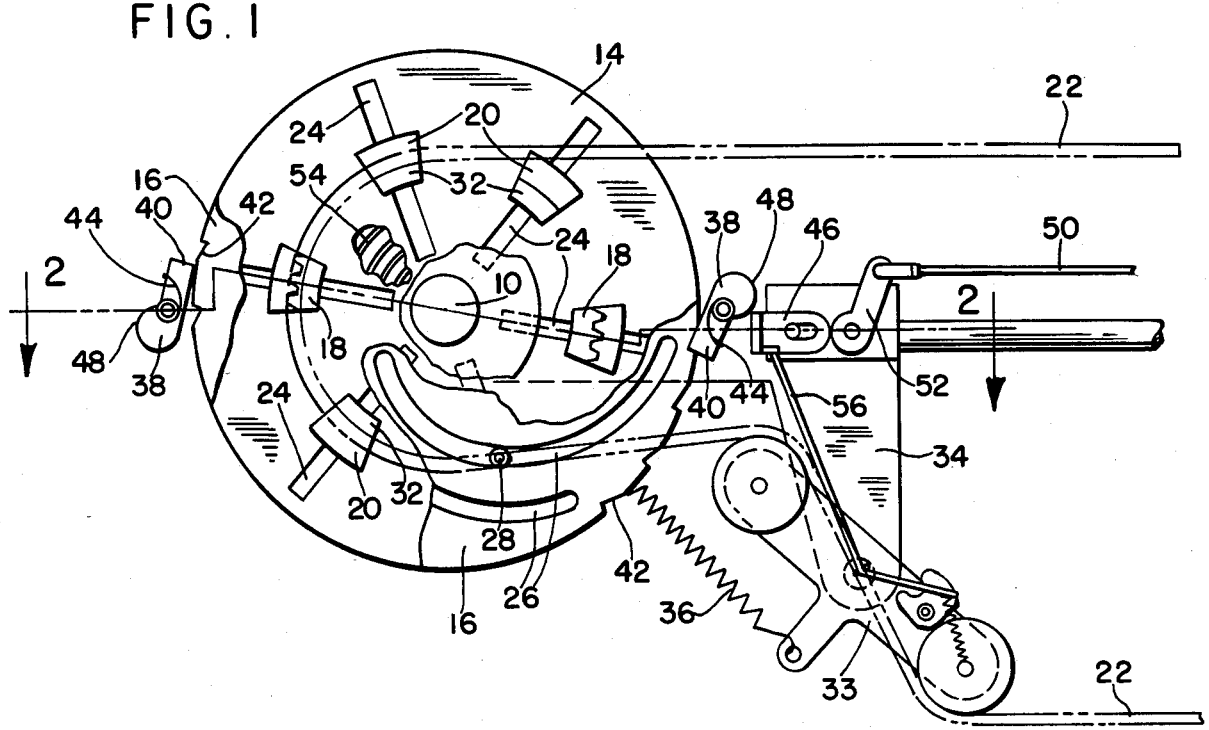
FIG. 1 is an elevational view showing the invention, parts being broken away.
Figure 2:
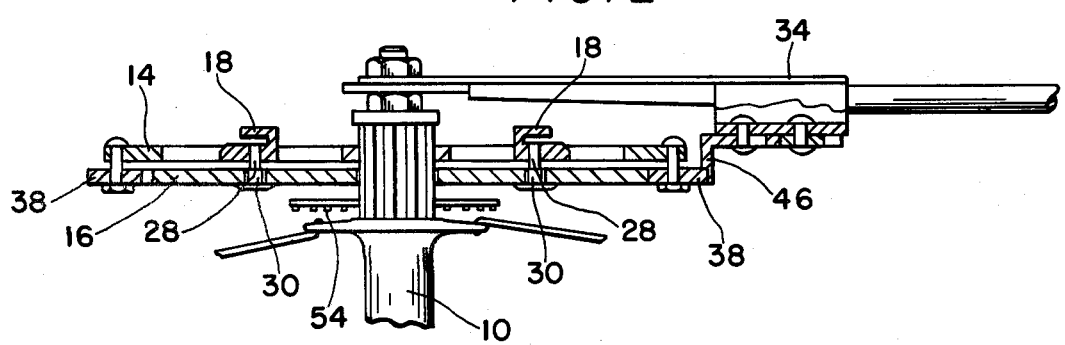
FIG. 2 is a sectional view taken on line 2—2 of FIG. 1.
Figure 3:
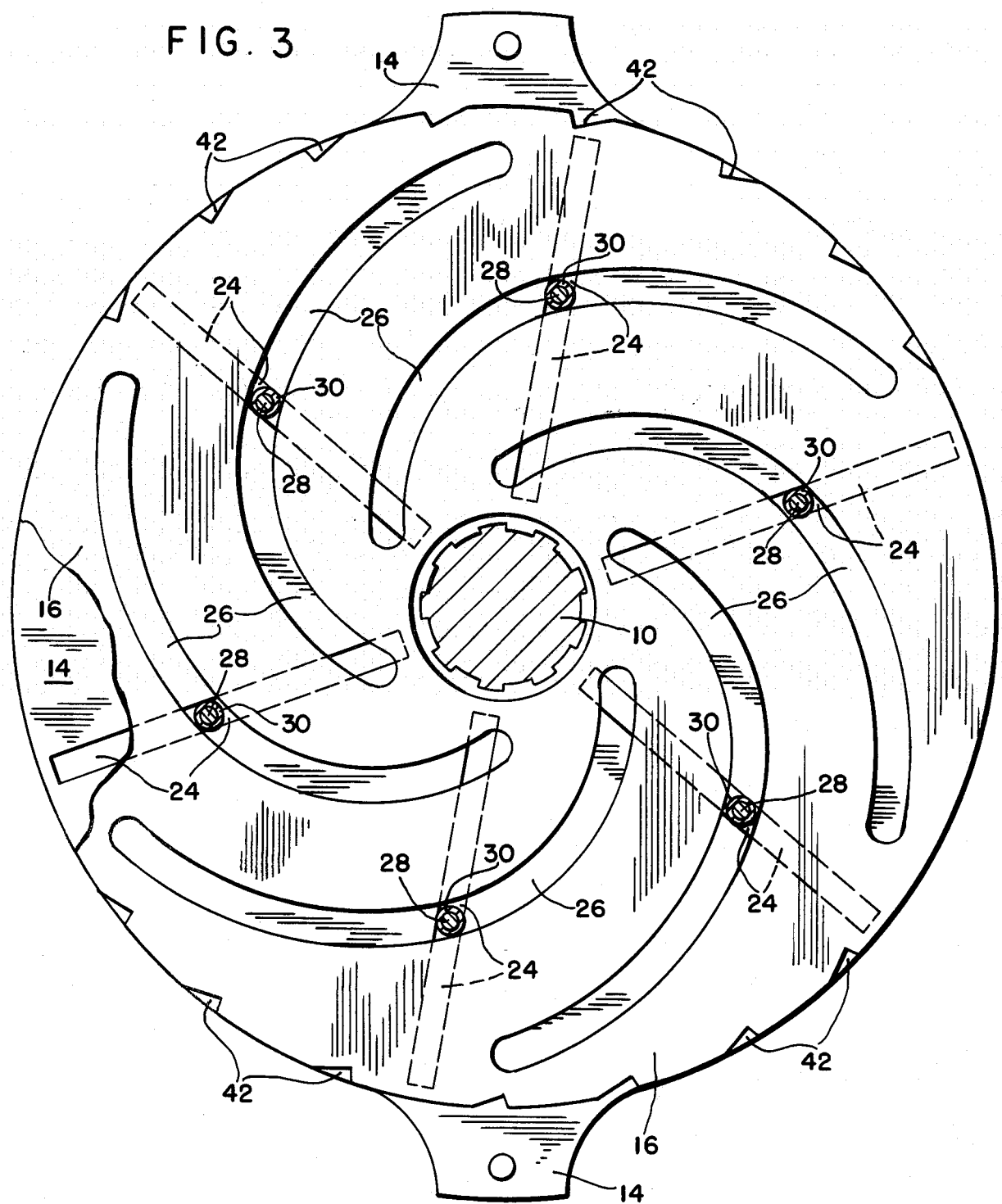
FIG. 3 is an elevational view of the drive and cam plates, illustrating the relationship thereof.

This invention presents a bicycle transmission that is wholly located to the rear of the pedals, the main components thereof being mounted on the rear axle 10. There are two circular plates mounted in closely set co-axial relation on the hub. These plates are the drive plate 14 and the cam plate 16. The drive plate has sprocket segments 18, 20 engaged by the usual chain 22 and six radially directed mutually spaced slots 24, and the cam plate has six curved cam slots 26. There is a stud or ferrule 28 for each dual set of radial slot on the drive plate and its respective cam slot on the cam plate and each ferrule or stud has a roller 30 in its cam slot.

Two of the ferrules or studs 18 that are located diametrically opposite each other are provided with sprockets and the other four sets of ferrules or studs 20 are free of such sprockets but each has a slider member 32 without sprockets. The ferrules or studs are hereinafter referred to as "sliders".

It will be clear that the cam plate curved slots 26 vary the positions of the sliders radially upon even a slight turn of cam plate 16 relative to drive plate 14 and such action varies the speed by reason of varying the effective diameter of the sprockets segments 18 and 20. It is to be particularly noted that of six sliders, all carrying the chain 22 and adjusting in unison, only two segments, those at 18, have chain interengaging teeth and as one toothed segment 18 passes from the chain, the other engages the chain, the two segments 18 being diametrically arranged. A chain tensioning device 33 is conveniently mounted on a bracket 34, itself mounted where desired or convenient adjacent the plates 14, 16, and a tensioner spring 36 is also adjacent. This chain tensioner acts as usual to keep the chain at its desired constriction of tautness.

Shift release locking pawls 38 are mounted on the drive plate at its periphery and are diametrically opposite. Each pawl has a finger 40 spring pressed toward an aligned notch 42 on the periphery of the cam plate 16 by simple leaf springs 44. This locks the plates together, but the notches are fifteen in number and there are eight notches in one 180 degree segment of the cam plate and seven in the other 180 degree segment thereof, so that but a single pawl is in active locking situation at a time. The pawl locking the plates is lifted out of locking condition by means of a movable striker 46 contacting and forcing the pawl out of its notch by its engagement with a pawl head 48 by reason of a pull by a cable 50 on a lever 52 so that the lever engages the striker 46 and moves it to engage the rounded head of the pawl 38 and rotate the latter sufficiently to leave its notch.

As soon as the cam plate is free of the drive plate, a spiral power spring 54 drives the cam plate rotationally relative to the drive plate and repositions the sprocket segments, changing the speed of the bicycle. The spiral power spring 54 is attached to the hub at one end and to the cam plate at its other end. The cable 50 extends to a convenient spot on the frame of the bicycle or on the handle bar where a simple lever or the like not shown, manually controls the shift as above described. The relative time between actuation of such device and the rotation of the two plates determines the degree of change in speed.

The force from the tensioner spring is applied through the idlers to the chain. In turn this force is applied to the slider and sprocket segments driving them towards a smaller radius. The torque applied by the tensioner spring through the segment ferrules to the cam plate is approximately equal and opposite to the torque applied by the spiral power spring. Because of this balanced torque the radius of the slider and sprocket segments will not change until an unbalancing torque is applied. If this unbalancing torque is provided by the riders pedalling force, this force is added to the tensioner spring force and the sliders and sprocket segments will be driven towards a smaller radius. This is prevented, except during shifting, by the shift pawl. If this unbalancing torque is provided by the removal of the tensioner load, as would be the case if the chain were locked to the tensioner and the rider pedalled in reverse, the spiral power spring will drive the sliders and sprocket segments to a greater radius until the tensioner spring force is reapplied.

When pedalling force is applied and the shift pawl strikes the striker plate, the shift pawl is pushed out of engagement with the cam plate and the sliders and sprocket segments are forced to a smaller radius. The 180 degree opposed shift pawl will then engage at the next smaller radius ratio. If this pawl then strikes the striker plate the process will be repeated until the smallest radius is reached. In this way, shifting to a higher gear (smaller radius) is performed one gear step at a time, needing 7½ revolutions of the drive plate to shift all 15 speeds. Shifting can be stopped at any particular ratio by simply retracting the striker plate.

For down shifting (larger radius) the striker plate is again extended, by the handlebar control, into the path of the shift pawl. The rider then pedals in reverse until the shift pawl strikes the striker plate on the reverse side. The shift pawl will push the striker plate out of the way by rotating it. The rotation will pull the down shift pawl, through the cable, into contact with the chain within the tensioner. The chain will then automatically lock to the tensioner and the tensioner spring load will be removed from the chain around the slider and sprocket segments and applied to the pedals. The slider and sprocket segments will then be driven to a larger radius by the spiral power spring. The shift pawls will offer no resistance to this motion as they are unidirectional. The rider then retracts the striker and pedals forward when the desired lower ratio is reached. In this manner downshifting through all 15 ratios is possible with one reverse application or only one gear shift can be made with a quick reverse application.

As is shown by the above, shifts can only be made when a shift pawl strikes the striker plate. Whenever this occurs there is only one sprocket segment engaged with the chain. If both were engaged shifting would not be possible. A cable 56 attached to the tensioner is provided which is used to operate a gear ratio indicator. This can be mechanical or electronic and is useful in showing the rider which gear he is in at any particular time.

I claim:

1. A bicycle transmission for a bicycle having a drive wheel and a chain to drive it, comprising a drive plate fixed with relation to the drive wheel, a cam plate in parallel side by side co-axial relation to the drive plate, radial mutually spaced slots in the drive wheel, corresponding curved cam slots in the cam plate, sliders, said radial slots and cam slots cooperating in pairs to accommodate a slider in each pair of slots whereby relative rotational motion of the plates causes the sliders to be moved radially, chain engaging sprockets on two only diametrically opposed sliders, the chain being engaged with one sprocketted slider and trained over the other sliders, notches at the periphery of the cam plate, said notches being mutually spaced, a locking pawl on the drive plate in position to lock the plates together by engagement with a notch, means to temporarily disengage the pawl from the notch, means normally urging the pawls toward plate locking position, and means to cause relative rotation of cam plate and drive plate while the pawl is disengaged.

2. The bicycle transmission of claim 1 including a second pawl on the drive plate diametrically opposite the first named pawl, said second pawl being free of any notch on the cam plate while the first named pawl is engaged in a notch.

3. The bicycle transmission of claim 1 wherein the notches are equal in number to the speed ration of the transmission.

4. The bicycle transmission of claim 1 wherein the drive chain engages sprockets on a single slider, the sprocketed sliders being diametrically opposite each other.

5. The bicycle transmission of claim 1 wherein the means to cause relative rotation of the drive and cam plates is elastomeric.

6. The bicycle transmission of claim 5 wherein the elastomeric means comprises a spring attached to both the plates.

7. The bicycle transmission of claim 6 wherein the spring is a co-planar helix with its ends attached to the respective plates.

8. A bicycle transmission for a bicycle having a drive wheel and a drive chain therefor, comprising a circular co-planar series of elements over which the chain is arranged, said elements being radially adjustable relative to the drive wheel, and means connecting the elements to the drive wheel to drive the latter under influence of the chain regardless of the radial adjusted positions of the elements, means to releasably secure the elements in selected radial positions of adjustment relative to the drive wheel, sprocket teeth to engage the chain on at least one of said elements, the remainder of the elements being free of such teeth, the elements being arranged to allow interengagement of but one element having sprocket teeth with the chain.

9. The bicycle transmission of claim 8 wherein the means connecting the elements to the drive wheel includes radial, mutually space slots in a circular drive plate on the drive wheel co-axially arranged thereon.

10. The bicycle transmission of claim 9 wherein the means to cause radial adjustment of the elements includes a cam plate co-axial with the drive plate and cams on the cam plate engaged with the elements.

11. The bicycle transmission of claim 8 including a manually operable device to actuate the element position securement to release the same.

12. A bicycle transmission for a bicycle having a drive wheel, a bicycle drive chain to drive it, and a hub on the wheel, said transmission comprising a drive plate fixed with relation to the hub, a cam plate on the hub but free thereof, said plates being closely adjacent, flat, and co-axial, a spring connecting said plates to cause relative rotation thereof and means to lock the plates together preventing such rotation, manually actuated means to release the locking means, and spring means normally urging the locking means toward locked position, a series of mutually spaced radial slots in the drive plate and cooperating similarly curved slots in the cam plate, each cam plate slot being intersected by a drive plate slot, a slider in each pair of cooperating cam and plate slots, the sliders being equally moved radially by relative motion of the plates, the chain being trained over said sliders for approximately one-half a circle defined by the sliders as a group, chain engaging sprockets on only two of said sliders, the latter being diametrically opposed so that the chain can engage only one slider at a time, the locking means comprising a series of notches on one plate and a pair of diametrically opposed notch-engaging pivoted pawls on the other plate, the notches equaling in number the number of speeds the transmission has, and said notches extending about the peripheral area of the plate they are on.

13. The bicycle transmission of claim 12 wherein the notches are in mis-alignment relative to the pawls, so that only one pawl can engage a notch at one time.

14. The bicycle transmission of claim 13 wherein the notches are arranged in two series, on of eight notches and the other of seven notches, said fifteen notches substantially filling the peripheral area.

15. The bicycle transmission of claim 14 wherein the pawls are mounted at the periphery of the drive plate and extend beyond the periphery of the cam plate and the notches are on the cam plate.

* * * * *